(12) United States Patent
Wang et al.

(10) Patent No.: US 11,844,121 B2
(45) Date of Patent: Dec. 12, 2023

(54) WIRELESS CONNECTION ESTABLISHMENT METHOD, APPARATUS, DEVICE, AND STORAGE MEDIUM

(71) Applicant: Apollo Intelligent Connectivity (Beijing) Technology Co., Ltd., Beijing (CN)

(72) Inventors: Qing Wang, Beijing (CN); Nengjun Ouyang, Beijing (CN); Xinxue Lei, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 284 days.

(21) Appl. No.: 17/353,005

(22) Filed: Jun. 21, 2021

(65) Prior Publication Data

US 2021/0315034 A1     Oct. 7, 2021

(30) Foreign Application Priority Data

Dec. 15, 2020    (CN) .......................... 202011475648.6

(51) Int. Cl.
*H04W 76/10*     (2018.01)
*H04W 76/14*     (2018.01)
(Continued)

(52) U.S. Cl.
CPC ............. *H04W 76/14* (2018.02); *H04W 4/40* (2018.02); *H04W 4/80* (2018.02); *H04W 84/12* (2013.01)

(58) Field of Classification Search
CPC . H04B 5/00; H04B 2201/71346; H04W 4/30; H04W 4/40; H04W 4/44;
(Continued)

(56) References Cited

U.S. PATENT DOCUMENTS 9,319,828 B2 *    4/2016    Decuir ................... H04W 4/80
2008/0057890 A1   3/2008    McKillop et al.
(Continued)

FOREIGN PATENT DOCUMENTS

CN       106982267 A       7/2017
CN       107864469 A       3/2018
(Continued)

OTHER PUBLICATIONS

European Search Report dated Dec. 10, 2021 for Application Serial No. 21180588.2.
(Continued)

*Primary Examiner* — Frank Duong
(74) *Attorney, Agent, or Firm* — Tucker Ellis LLP

(57) ABSTRACT

The present disclosure discloses a wireless connection establishment method, an apparatus, a device and a storage media, which is applied to artificial intelligence, Internet of Vehicles and intelligent transportation technologies in the field of computer technology. A specific implementation scheme is as follows: by before establishing a WiFi direct connection between a car machine apparatus and a terminal device, a Bluetooth communication connection between the two is established firstly, the car machine apparatus provides parameter information required to establish the WiFi direct connection with the car machine apparatus to the terminal device through the Bluetooth communication connection, then the terminal device can automatically send a WiFi direct connection request to the car machine apparatus based on the parameter information, and the car machine apparatus device establishes the WiFi direct connection with the terminal device in response to the WiFi direct connection request initiated by the terminal device.

8 Claims, 8 Drawing Sheets

(51) Int. Cl.
*H04W 4/80* (2018.01)
*H04W 4/40* (2018.01)
*H04W 84/12* (2009.01)

(58) Field of Classification Search
CPC ........... H04W 4/46; H04W 4/48; H04W 4/80; H04W 76/14; H04W 84/12; H04W 84/18; H04L 69/24
See application file for complete search history.

(56) References Cited

U.S. PATENT DOCUMENTS

| | | | |
|---|---|---|---|
| 2009/0215398 A1* | 8/2009 | Adler | H04W 12/50 455/41.3 |
| 2014/0378058 A1 | 12/2014 | Decuir et al. | |
| 2015/0327138 A1* | 11/2015 | Lee | H04W 76/34 455/426.1 |
| 2016/0234870 A1* | 8/2016 | Borges | H04W 4/44 |
| 2016/0278006 A1* | 9/2016 | Lee | H04W 12/04 |
| 2016/0302026 A1* | 10/2016 | Lee | H04W 8/005 |
| 2017/0223579 A1 | 8/2017 | Lee et al. | |
| 2019/0268749 A1* | 8/2019 | Jiang | H04W 4/80 |

FOREIGN PATENT DOCUMENTS

| | | |
|---|---|---|
| CN | 109309967 A | 2/2019 |
| CN | 109362119 A | 2/2019 |
| CN | 110913014 A | 3/2020 |
| EP | 3506517 A1 | 7/2019 |
| JP | 2015-104098 A | 6/2015 |
| JP | 2018-137647 A | 8/2018 |
| JP | 2019-532567 A | 11/2019 |

OTHER PUBLICATIONS

Office Action of corresponding Japanese Application No. 2021-111573, dated Jul. 6, 2022, 4 pages.
Translation of Office Action of corresponding Japanese Application No. 2021-111573, dated Jul. 6, 2022, 4 pages.
Office Action of corresponding Korean Application No. 10-2021-0080734, dated Jun. 22, 2022, 6 pages.
Translation of Office Action of corresponding Korean Application No. 10-2021-0080734, dated Jun. 22, 2022, 6 pages.
Office Action for corresponding Chinese Patent Application No. 2020114756486, dated Aug. 30, 2022, 9 pages.
Decision to Grant a Patent of corresponding Japanese Patent Application No. 2021-111573, dated Mar. 29, 2023, 5 pages.

* cited by examiner

WIRELESS CONNECTION ESTABLISHMENT METHOD, APPARATUS, DEVICE, AND STORAGE MEDIUM

CROSS-REFERENCE TO RELATED APPLICATIONS

The present disclosure claims priority to Chinese Patent Application No. 202011475648.6, filed on Dec. 15, 2020, which is hereby incorporated by reference in its entirety.

TECHNICAL FIELD

The present disclosure relates to artificial intelligence, Internet of Vehicles, and intelligent transportation technology in computer technology, and in particular to a wireless connection establishment method, an apparatus, a device and a storage medium.

BACKGROUND

In a process of driving a vehicle, drivers and passengers usually hope to interconnect terminal devices such as mobile phones and tablet computers with the vehicle, so as to display content presented on the terminal device through an output apparatus of the vehicle.

A traditional interconnection between the terminal devices such as the mobile phones and so forth and the vehicle usually includes the following methods: a USB wired connection, a WiFi hotspot wireless connection and a WiFi direct wireless connection. Among them, the USB wired connection method is complicated to be operated, and users need to perform complicated operation steps to complete a connection every time the connection is made; in addition, there are a large number of unqualified USB data cables on the market, so that the connection is often unstable. The WiFi hotspot wireless connection method requires a hotspot of the mobile phone, it is not only consumes a lot of power, but also a connection jam problem often occurs since the hotspot of the mobile phone is often unstable, which causes a poor effect. The WiFi direct wireless connection method can scan all surrounding wireless connection devices, which requiring the user to manually select the device to be connected, and an automatic connection cannot be realized.

SUMMARY

This application provides a wireless connection establishment method, an apparatus, a device and a storage medium.

According to one aspect of the present disclosure, a wireless connection establishment method is provided, which is applied to a car machine apparatus, including:
establishing a Bluetooth communication connection with a terminal device to be connected;
providing parameter information required to establish a WiFi direct connection to the terminal device through the Bluetooth communication connection; and
establishing the WiFi direct connection with the terminal device in response to a WiFi direct connection request sent by the terminal device based on the parameter information.

According to another aspect of the present disclosure, a wireless connection establishment method is provided, which is applied to a terminal device, and the terminal device is used to establish a WiFi direct connection communication with a car machine apparatus on a vehicle, including:
establishing a Bluetooth communication connection with the car machine apparatus of the vehicle;
obtaining parameter information required to establish a WiFi direct connection through the Bluetooth communication connection; and
sending a WiFi direct connection request to the car machine apparatus according to the parameter information required to establish the WiFi direct connection, to establish the WiFi direct connection with the car machine apparatus.

According to another aspect of the present disclosure, a wireless connection establishment apparatus is provided, which is applied to a car machine apparatus, including:
a Bluetooth module, configured to establish a Bluetooth communication connection with a terminal device to be connected;
the Bluetooth module is further configured to provide parameter information required to establish a WiFi direct connection to the terminal device through the Bluetooth communication connection; and
a WiFi module, configured to establish the WiFi direct connection with the terminal device in response to a WiFi direct connection request sent by the terminal device according to the parameter information.

According to another aspect of the present disclosure, a wireless connection establishment apparatus is provided, which is applied to a terminal device, and the terminal device is used to establish a WiFi direct connection communication with a car machine apparatus on a vehicle, including:
a Bluetooth module, configured to establish a Bluetooth communication connection with the car machine apparatus of the vehicle;
the Bluetooth module is further configured to obtain parameter information required to establish a WiFi direct connection through the Bluetooth communication connection; and
a WiFi module, configured to send a WiFi direct connection request to the car machine apparatus according to the parameter information required to establish the WiFi direct connection, to establish a WiFi direct connection with the car machine apparatus.

According to another aspect of the present disclosure, an electronic device is provided, including:
at least one processor; and
a memory communicatively connected with the at least one processor; where,
the memory stores instructions executable by the at least one processor, and the instructions are executed by the at least one processor, enables the at least one processor to execute the method according to any one of the above aspect.

According to another aspect of the present disclosure, a non-transitory computer-readable storage medium storing computer instructions is provided, the computer instructions are used to enable a computer to execute the method according to any one of the above aspect.

According to another aspect of the present disclosure, a computer program product is provided, including a computer program, the computer program implements the method according to any one of the above aspect when executed by a processor.

According to the technology of the present disclosure, a WiFi direct connection is automatically established between a mobile terminal and a car machine apparatus.

It should be understood that content described in this section is not intended to identify key or important features of embodiments of the present disclosure, nor is it intended to limit a scope of the present disclosure. Other features of the present disclosure will become easily understood through the following instructions.

BRIEF DESCRIPTION OF DRAWINGS

The drawings are used to better understand this solution, and do not constitute a limitation to the application. In which.

DESCRIPTION OF EMBODIMENTS

Exemplary embodiments of the present disclosure are described below with reference to drawings, which include various details of the embodiments of the present disclosure to facilitate understanding, and which should be considered as merely exemplary. Therefore, those of ordinary skill in the art should realize that various changes and modifications can be made to the embodiments described herein without departing from a scope and spirit of the present disclosure. Likewise, for clarity and conciseness, descriptions of well-known functions and structures are omitted in the following description.

The present disclosure provides a wireless connection establishment method, an apparatus, a device and a storage medium, which are applied to artificial intelligence, Internet of Vehicles, and intelligent transportation technologies in the field of computer technology to automatically establish a WiFi direct connection between a mobile terminal and a car machine apparatus on a vehicle, which can reduce user manual operations.

The wireless connection establishment method provided by the present disclosure can be applied to a scene where a terminal device such as a mobile phone of a user and the car machine apparatus on the vehicle of the user automatically establish a WiFi direct connection to realize a data interaction between the terminal device and the car machine apparatus.

Figure 1:
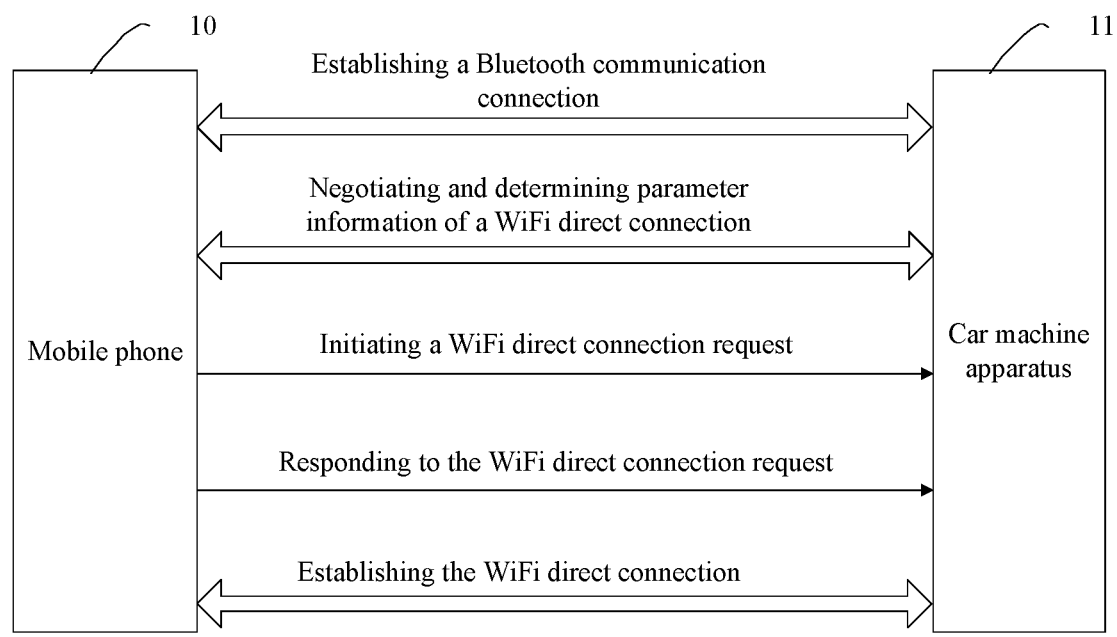
FIG. 1 is a scene diagram that can realize a wireless connection establishment according to an embodiment of the present disclosure.

For example, FIG. 1 is a scene diagram that can realize a wireless connection establishment according to an embodiment of the present disclosure. In the scene shown in FIG. 1, the terminal device may be the mobile phone 10 of the user, and the mobile phone 10 has both WiFi direct connection function and Bluetooth function, the car machine apparatus can be a car machine 11 having the WiFi direct connection function and the Bluetooth function on the vehicle. In the process of automatically establishing a WiFi direct connection, the mobile phone 10 establishes a Bluetooth communication connection with the car machine 11 firstly, and then the mobile phone 10 and the car machine 11 negotiate and determine parameter information required to establish the WiFi direct connection based on the Bluetooth communication connection, the mobile phone 10 initiates a WiFi direct connection request based on the negotiated and determined parameter information, and the car machine 11 establishes a WiFi direct connection between the mobile phone 10 and the car machine 11 in response to the WiFi direct connection request. After the WiFi direct connection is established, the mobile phone 10 can perform the data interaction with the car machine 11 through the WiFi direct connection. For example, content displayed on the screen of the mobile phone can be projected to the display screen of the car machine on the vehicle for display.

Figure 2:
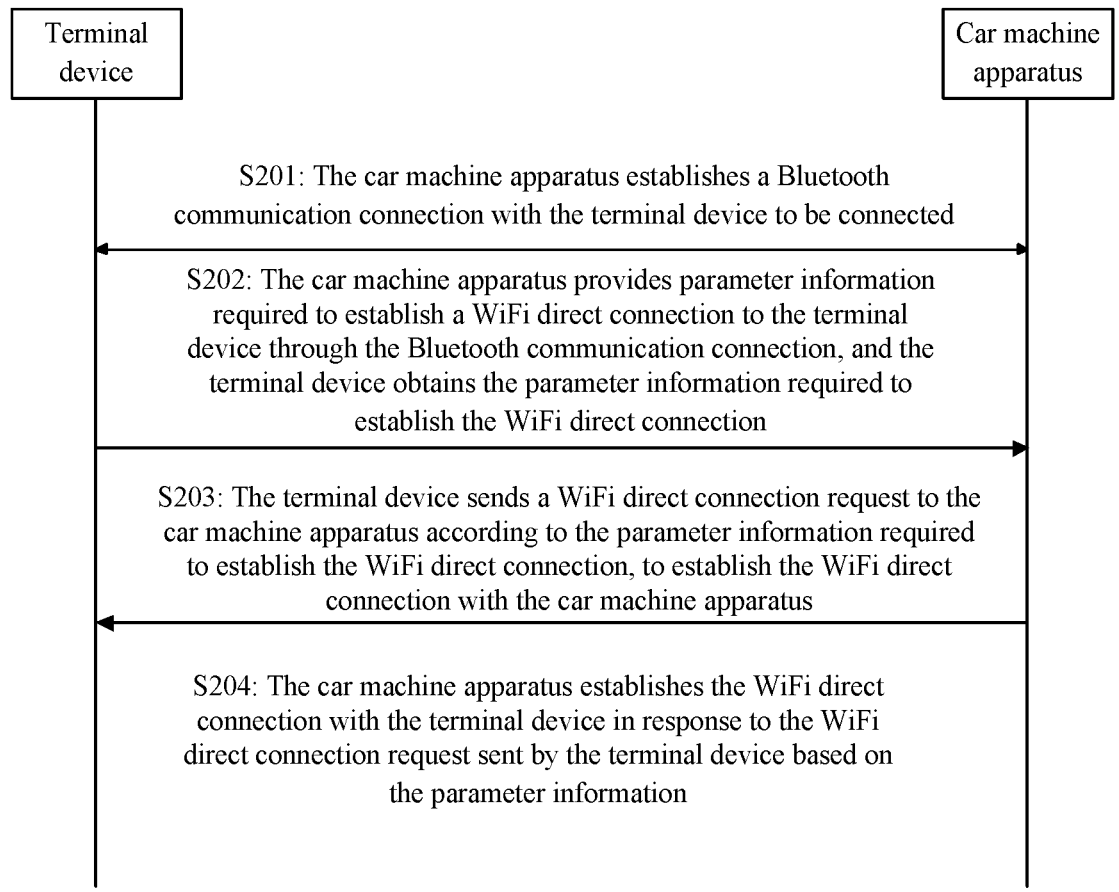
FIG. 2 is a flowchart of a wireless connection establishment method provided by a first embodiment of the present disclosure.

FIG. 2 is a flowchart of a wireless connection establishment method provided by a first embodiment of the present disclosure. As shown in FIG. 2, the specific steps of the method are as follows:

Step S201: The car machine apparatus establishes a Bluetooth communication connection with a terminal device to be connected.

In this embodiment, in order to realize the automatic establishment of a WiFi direct connection between the car machine apparatus and the terminal device to be connected, a Bluetooth communication connection automatically established between the car machine apparatus and the terminal device is established firstly.

In which, the Bluetooth communication connection between the car machine apparatus and the terminal device is used for the car machine apparatus to provide the terminal device with parameter information required to establish a WiFi direct connection.

Step S202: The car machine apparatus provides the parameter information required to establish the WiFi direct connection to the terminal device through the Bluetooth communication connection, and the terminal device obtains the parameter information required to establish the WiFi direct connection.

After the Bluetooth communication connection is established between the car machine apparatus and the terminal device, the car machine apparatus and the terminal device perform a data interaction through the Bluetooth communication connection, the car machine apparatus provides the parameter information required to establish the WiFi direct connection to the terminal device, and the terminal device can obtain the parameter information required to establish the WiFi direct connection with the car machine apparatus.

In this embodiment, the parameter information required to establish the WiFi direct connection provided by the car machine apparatus to the terminal device refers to the parameter information required to establish the WiFi direct connection with the car machine apparatus. The parameter information at least includes a WiFi device identifier of the car machine apparatus. The parameter information may also include the parameters required to establish the WiFi direct connection such as a WiFi direct connection service name, a WiFi direct connection service type, whether the WiFi direct connection is supported, and an available WiFi direct connection frequency band and so forth.

In which, the WiFi device identifier of the car machine apparatus is used to uniquely identify the car machine apparatus, and the WiFi device identifiers of the car machine apparatus of different vehicles are different. For example, the WiFi device identifier of the car machine apparatus may be a name, communication address of the car machine apparatus and so forth.

Step S203: The terminal device sends a WiFi direct connection request to the car machine apparatus according to the parameter information required to establish the WiFi direct connection, to establish the WiFi direct connection with the car machine apparatus.

After the parameter information required to establish the WiFi direct connection with the car machine apparatus is obtained, the terminal device can automatically send the WiFi direct connection request to the car machine apparatus based on the WiFi device identifier of the car machine apparatus in the parameter information, and there is no need to manually select the car machine apparatus to be connected by the user.

Step S204: The car machine apparatus establishes the WiFi direct connection with the terminal device in response to the WiFi direct connection request sent by the terminal device based on the parameter information.

After monitoring the WiFi direct connection request, the car machine apparatus accepts the request and establish the WiFi direct connection with the terminal device that initiated the request.

The embodiment of the present disclosure allows for before establishing the WiFi direct connection between the car machine apparatus and the terminal device, the Bluetooth communication connection between the two is established firstly, the car machine apparatus provides the parameter information required to establish the WiFi direct connection with the car machine apparatus to the terminal device through the Bluetooth communication connection, then the terminal device can automatically send the WiFi direct connection request to the car machine apparatus based on the parameter information, and the car machine apparatus device establishes the WiFi direct connection with the terminal device in response to the WiFi direct connection request initiated by the terminal device without a manual search as well as a selection and confirmation of the WiFi device to be connected by the user, an automatic establishment of the WiFi direct connection between the car machine apparatus and the terminal device is realized, user operations are reduced, and would not affect other functions such as driving the vehicle or using the terminal device by the user.

Figure 3A:
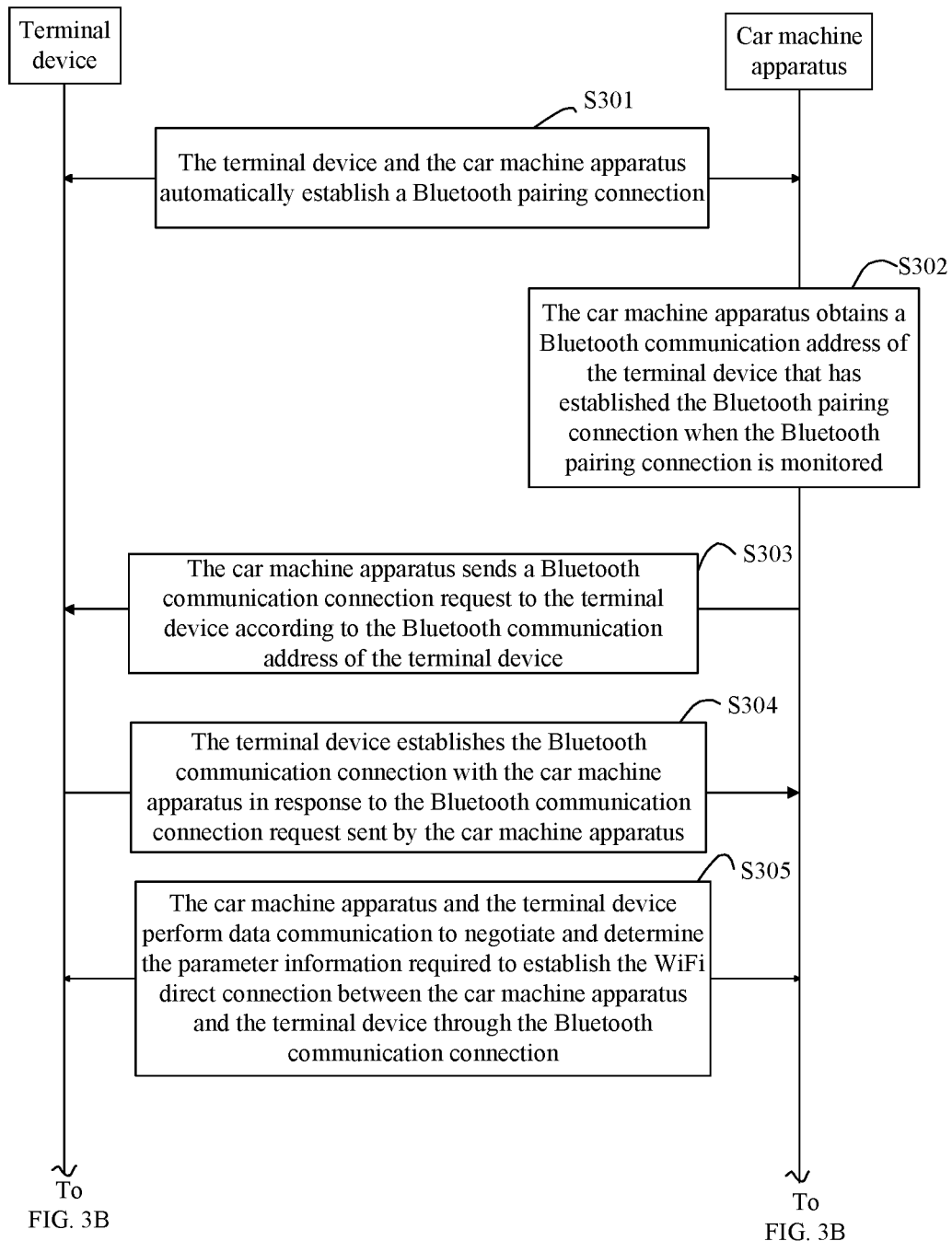
FIG. 3A and FIG. 3B are flowcharts of a wireless connection establishment method provided by a second embodiment of the present disclosure.
Figure 3B:
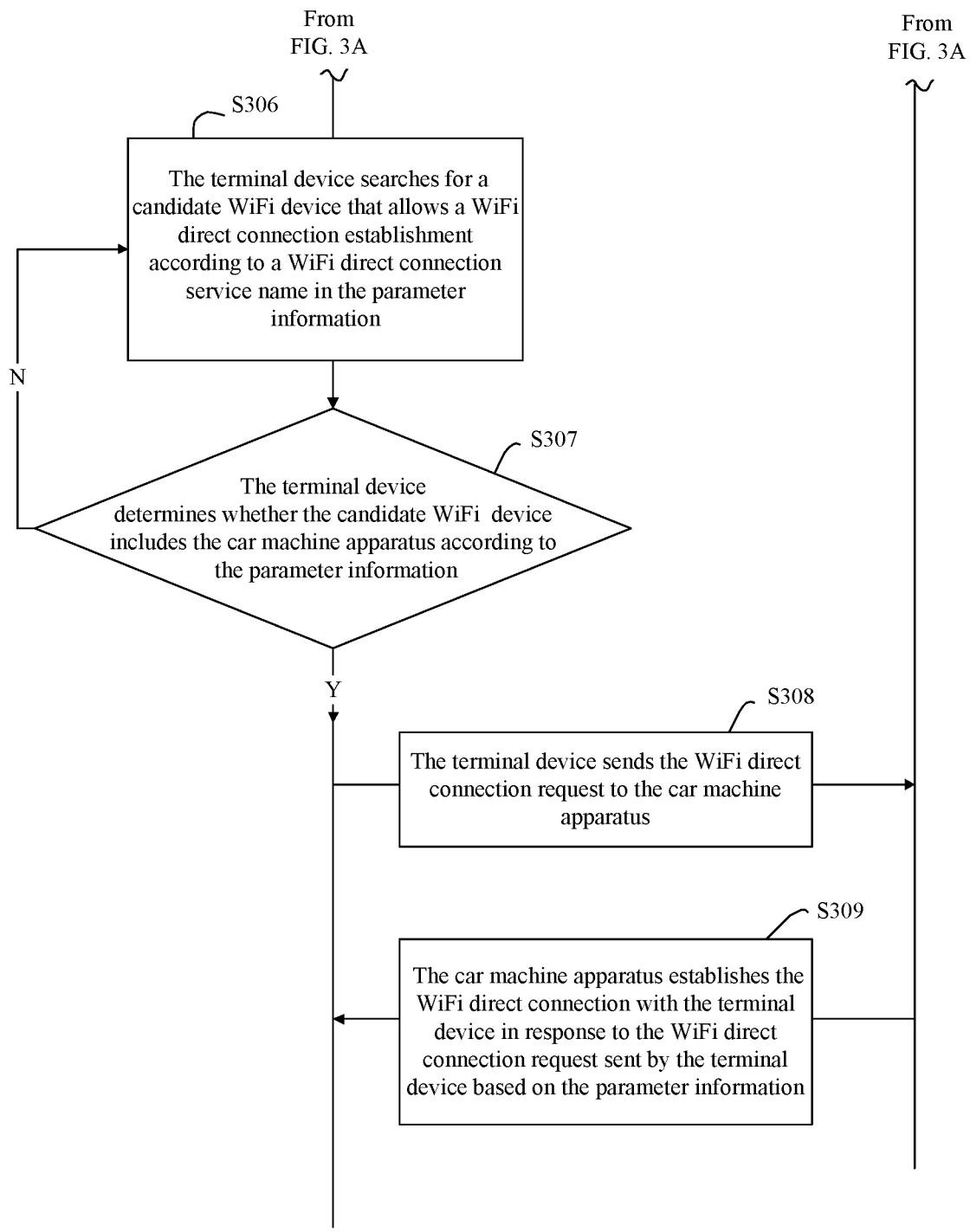

FIG. 3A and FIG. 3B are flowcharts of a wireless connection establishment method provided by a second embodiment of the present disclosure. On the basis of the above-mentioned first embodiment, in this embodiment, a car machine apparatus establishes a Bluetooth communication connection with a terminal device to be connected includes: when the Bluetooth pairing connection is monitored, the car machine apparatus obtains a Bluetooth communication address of the terminal device that has established a Bluetooth pairing connection; sends a Bluetooth communication connection request to the terminal device according to the Bluetooth communication address of the terminal device, so as to establish the Bluetooth communication connection with the terminal device. And the terminal device establishes the Bluetooth communication connection with the car machine apparatus in response to the Bluetooth communication connection request sent by the car machine apparatus.

As shown in FIG. 3A and FIG. 3B, specific steps of the method are as follows:

Step S301: The terminal device and the car machine apparatus automatically establish the Bluetooth pairing connection.

In this embodiment, after a first Bluetooth pairing between the terminal device and the car machine apparatus, when the terminal device and the car machine apparatus are within a communication range, the terminal device and the car machine apparatus can automatically perform the Bluetooth pairing connection.

Generally, when a user starts a vehicle, the user usually has boarded or arrived near the vehicle, and a mobile terminal carried by the user enters the communication range of the car machine apparatus on the vehicle. If the user has established the Bluetooth pairing connection with the car machine apparatus by using the mobile terminal, then the mobile terminal and the car machine apparatus will automatically perform the Bluetooth pairing to establish the Bluetooth pairing connection.

In practical applications, the user needs to manually operate the Bluetooth pairing only when the mobile device and the car machine apparatus establish the Bluetooth pairing connection for the first time. In subsequent usage processes, the terminal device and the car machine apparatus can automatically perform the Bluetooth pairing connection.

In this embodiment, a process of automatically establishing the Bluetooth pairing connection between the terminal device and the car machine apparatus is consistent with the process of automatically performing the Bluetooth pairing between the terminal device and the vehicle in the prior art, which will not be repeated herein.

Step S302: The car machine apparatus obtains the Bluetooth communication address of the terminal device that has established the Bluetooth pairing connection when the Bluetooth pairing connection is monitored.

The car machine apparatus can obtain the Bluetooth communication address of the terminal device with which the vehicle has previously established the Bluetooth pairing connection. For example, Bluetooth connection history information of the vehicle can be obtained through a system layer of the vehicle. The Bluetooth connection history information may include information such as the terminal devices that have established the Bluetooth pairing connection with the vehicle, time for establishing the Bluetooth pairing connection and the Bluetooth communication address.

In practical applications, the mobile terminal used by the user and the vehicle of the user will usually not change for a long period of time, and the mobile terminal used by the user to connect to the car machine apparatus will not change for a long period of time. The terminal device that successfully established the WiFi direct connection with the car machine apparatus last time can be given priority as the terminal device that established the WiFi direct connection this time, which can improve an efficiency and a success rate of the WiFi direct connection, and is closer to an actual use habits of the user.

In an optional implementation, this step may be specifically implemented in the following manner:

when the Bluetooth pairing connection is monitored, in a case that it is determined that it is not a first WiFi direct connection according to historical WiFi direct connection data, then the terminal device that established the WiFi direct connection last time is taken as the terminal device to establish the WiFi direct connection this time; in a case that the terminal device has not been established the Bluetooth pairing connection with the car machine apparatus, the Bluetooth communication address of the terminal device is obtained after waiting for the Bluetooth pairing connection has been established with the terminal device.

When the Bluetooth pairing connection is monitored, in a case that it is determined that it is the first WiFi direct connection according to the historical WiFi direct connection data, a device that has been established with the Bluetooth pairing connection currently is taken as the terminal device, and the Bluetooth communication address of the terminal device is obtained.

Specifically, when the Bluetooth pairing connection is monitored, the car machine apparatus can obtain the historical WiFi direct connection data. The historical WiFi direct connection data may include data such as time, terminal device and so forth, to establish the WiFi direct connection with the car machine apparatus in the past. Based on the historical WiFi direct connection data, it can be queried how many times the car machine apparatus has established the WiFi direct connection, and objects and time to establish the WiFi direct connection each time. In this way, the car machine apparatus can determine whether it is the first WiFi direct connection based on the historical WiFi direct connection data. If the car machine apparatus has established the WiFi direct connection with at least one terminal device, it is determined that it is not the first WiFi direct connection. At this time, the terminal device that has established the WiFi direct connection with the car machine apparatus last time is likely to be the terminal device that will establish the WiFi direct connection with the car machine apparatus device this time. Then the terminal device has been established the WiFi direct connection last time can be used as the terminal device establishes WiFi direct connection this time, and the Bluetooth communication address of the terminal device that has been established the WiFi direct connection last time can be obtained, so as to establish the Bluetooth communication connection with the terminal device.

If the terminal device that established the WiFi direct connection last time has not established the Bluetooth pairing connection with the car machine apparatus, the Bluetooth communication address of the terminal device is obtained after waiting to establish the Bluetooth pairing connection with the terminal device, so as to establish the Bluetooth communication connection with the terminal device.

Further, if the car machine apparatus has not established the WiFi direct connection with any terminal device, it is determined that a current WiFi direct connection is the first WiFi direct connection. At this time, the car machine apparatus can take the device that has currently established the Bluetooth pairing connection as the terminal device that is about to establish the WiFi direct connection, and the Bluetooth communication address of the terminal device is obtained to establish the Bluetooth communication connection with the terminal device, so that a process of establishing the WiFi direct connection is more intelligent and efficient.

The car machine apparatus can automatically establish a Bluetooth communication connection with the terminal device based on the obtained Bluetooth communication address of the terminal device.

In addition, in this embodiment, the car machine apparatus can provide a resident service, which is used to automatically establish the Bluetooth communication connection with the mobile terminal, and negotiate and determine the parameter information required to establish the WiFi direct connection between the terminal device and the car machine apparatus through the Bluetooth communication connection.

Step S303: The car machine apparatus sends the Bluetooth communication connection request to the terminal device according to the Bluetooth communication address of the terminal device.

After the terminal device that will establish the direct WiFi connection with the car machine apparatus and its Bluetooth communication address is determined, in this step, the car machine apparatus sends the Bluetooth communication connection request to the terminal device, requesting to establish the Bluetooth communication connection with the terminal device.

In which, the Bluetooth communication connection between the car machine apparatus and the terminal device refers to a Bluetooth socket (Socket) connection.

In practical applications, the terminal devices (such as the mobile phones) usually cannot obtain Bluetooth devices that have been paired and connected from an application layer, and can only monitor a moment of a pairing connection. In this way, if WiFi direct connection function of the terminal device is activated after the Bluetooth pairing connection, the terminal device cannot automatically initiate the Bluetooth communication connection request to a pairing connected device, and it cannot automatically select a target object of the WiFi direct connection and establish the WiFi direct connection. In this embodiment, the Bluetooth communication address of the pairing connected terminal device can be obtained by the car machine apparatus of the vehicle, and the Bluetooth communication connection is initiated, so that a subsequent process of automatically establishing the WiFi direct connection can be realized.

Optionally, if the terminal device which is the object that initiates the Bluetooth communication request is the terminal device that established the direct WiFi connection with the car machine apparatus last time, prompt information can be sent to the terminal device, and the prompt information is used to prompt the user to open a client on the terminal device which is used to establish the WiFi direct connection, enables the user to open a WiFi direct connection client on the terminal device and activate function of establishing the WiFi direct connection between the terminal device and the car machine apparatus.

Specifically, after the Bluetooth communication connection request is sent to the terminal device, if the Bluetooth communication address of the terminal device as the object of the Bluetooth communication request is the same as the Bluetooth communication address of the terminal device that established the direct WiFi connection with the car machine apparatus last time, the prompt information then will be issued.

Optionally, the prompt information can be displayed on the terminal device, staying on the terminal device for a longer period of time, so that the user can find the prompt information, which would avoid frequent pop-up messages that have a significant impact on the user.

Step S304: The terminal device establishes the Bluetooth communication connection with the car machine apparatus in response to the Bluetooth communication connection request sent by the car machine apparatus.

In this embodiment, the car machine apparatus actively sends the Bluetooth communication connection request to the terminal device, and the terminal device establishes the Bluetooth communication connection with the car machine apparatus in response to the Bluetooth communication connection request, which can realize the automatic establishment of the Bluetooth communication connection between the car machine apparatus and the terminal device, and provide a communication channel for a subsequent automatic establishment of the WiFi direct connection.

Step S305: The car machine apparatus and the terminal device perform data communication to negotiate and determine the parameter information required to establish the WiFi direct connection between the car machine apparatus and the terminal device through the Bluetooth communication connection.

After the Bluetooth communication connection between the car machine apparatus and the terminal device is established, a data communication with the car machine apparatus is performed through the Bluetooth communication connection to perform a communication verification on the parameter information required to establish the WiFi direct connection between the two, so as to negotiate and determine the parameter information required to establish the WiFi direct connection with the car machine apparatus, thereby realizing an automatic negotiation and determination of WiFi direct connection parameters, and providing available parameter information for the automatic establishment of the WiFi direct connection.

In which, the parameter information required to the WiFi direct connection includes at least: a WiFi direct connection service name, and the WiFi device identifier of the car machine apparatus. In addition, the parameter information may also include the parameters required to establish the WiFi direct connection such as a WiFi direct connection service type, whether the WiFi direct connection is supported, an available WiFi direct connection frequency band and so forth.

After the parameter information required to establish the WiFi direct connection with the car machine apparatus is obtained, the terminal device sends the WiFi direct connection request to the car machine apparatus according to the parameter information required to establish the WiFi direct connection through the following steps S306-S308, so as to automatically establish the WiFi direct connection.

Step S306: The terminal device searches for a candidate WiFi device that allows a WiFi direct connection establishment according to the WiFi direct connection service name in the parameter information.

In this embodiment, after the parameter information required to establish the WiFi direct connection with the car machine apparatus is obtained, the terminal device searches for the candidate WiFi device that allows the WiFi direct connection establishment according to the WiFi direct connection service name in the parameter information, that is, WiFi devices that can be connected around, as the candidate WiFi device.

Step S307: The terminal device determines whether the candidate WiFi device includes the car machine apparatus according to the parameter information.

In this step, according to the WiFi device identifier of the car machine apparatus in the parameter information, the terminal device executes step S306 if it is determined that the candidate WiFi device does not include the car machine apparatus, searching for the candidate WiFi device that allows the WiFi direct connection establishment again, until the searched candidate WiFi device include the car machine apparatus.

In this step, according to the WiFi device identifier of the car machine apparatus in the parameter information, executing step S308 if it is determined that the candidate WiFi device includes the car machine apparatus, so as to send the WiFi direct connection request to the car machine apparatus.

Step S308: The terminal device sends the WiFi direct connection request to the car machine apparatus.

In this embodiment, after the candidate WiFi device that allows the WiFi direct connection establishment has been searched, the terminal device automatically selects the car machine apparatus that determined to establish the WiFi direct connection from the candidate WiFi device, based on the WiFi device identifier of the car machine apparatus that is about to establish the WiFi direct connection in the parameter information, and then sends the WiFi direct connection request to the car machine apparatus, there is no need to manually search for and select a target of the WiFi direct connection establishment by the user.

Step S309: The car machine apparatus establishes the WiFi direct connection with the terminal device in response to the WiFi direct connection request sent by the terminal device based on the parameter information.

For example, in the parameter information to establish the WiFi direct connection, the WiFi direct connection service name can be "ClfWfd_vehicle". The mobile phone will continuously search for connectable WiFi devices and screen the connectable WiFi devices whose service name as "ClfWfd_vehicle" by the WiFi direct connection service name, that is, the candidate WiFi device that allows the direct WiFi connection establishment; then screen, according to the obtained WiFi device identifier of the car machine apparatus in the parameter information, one WiFi device that matches the WiFi device identifier of the car machine apparatus in the parameter information, through which, the car machine apparatus that will establish the WiFi direct connection can be determined; and initiate the WiFi direct connection request to the car machine apparatus. The car machine apparatus accepts the request, and establishes the WiFi direct connection with the terminal device.

Figure 4:
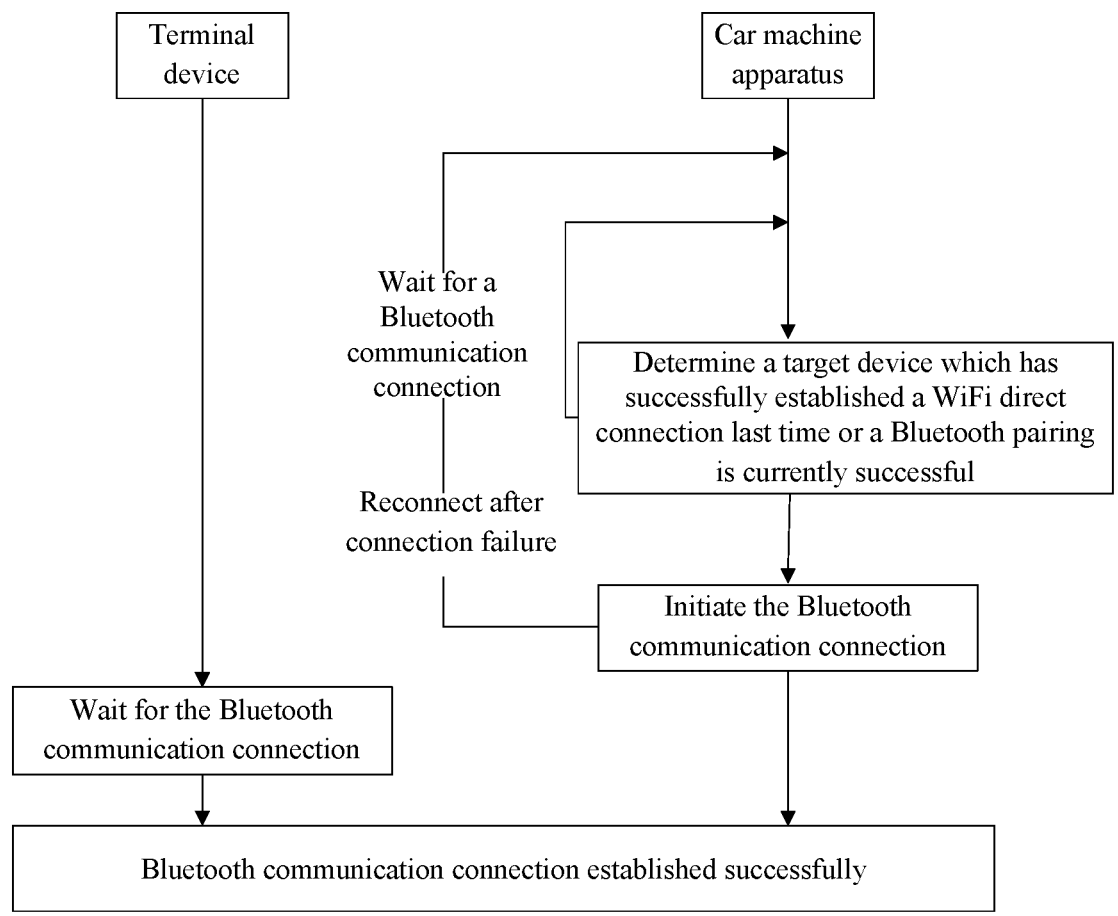
FIG. 4 is a flow schematic diagram of a Bluetooth communication connection establishment provided by the second embodiment of the present disclosure.

Exemplarily, the following is an exemplary description of an overall process of automatically establishing a Bluetooth communication connection (Bluetooth Socket connection) between a terminal device and on car machine apparatus with reference to FIG. 4: after the terminal device and the car machine apparatus automatically establishing a Bluetooth pairing connection, in a phase of establishing a Bluetooth communication connection, the car machine apparatus initiates a Bluetooth communication connection request to the terminal device, and the terminal device waits for the Bluetooth communication connection request. Specifically, the car machine apparatus determines a target device which was successfully established the WiFi direct connection at the last time or has been successfully Bluetooth paired, if it is determined that the target device has failed, that is, a device which was successfully established the WiFi direct connection at the last time or has been successfully Bluetooth paired is not obtained, then the target device will be re-determined after a first preset duration; if the target device is successfully determined, then the Bluetooth communication connection request will be initiated to the target device. The terminal device as the target device will establishes the Bluetooth communication connection with the car machine apparatus in response to the Bluetooth communication connection request. If the Bluetooth communication connection fails, the car machine apparatus will re-determine the target device and initiate the Bluetooth communication connection request to the target device after a second preset duration, until the Bluetooth communication connection is successfully established with the target device.

The first preset duration and the second preset duration can be set and adjusted according to actual application scenes, and the first preset duration and the second preset duration can be the same. For example, the first preset duration and the second preset duration may be 2 seconds, 3 seconds, 5 seconds and so forth, or the first preset duration and the second preset duration may also be different, which is not specifically limited herein.

Figure 5:
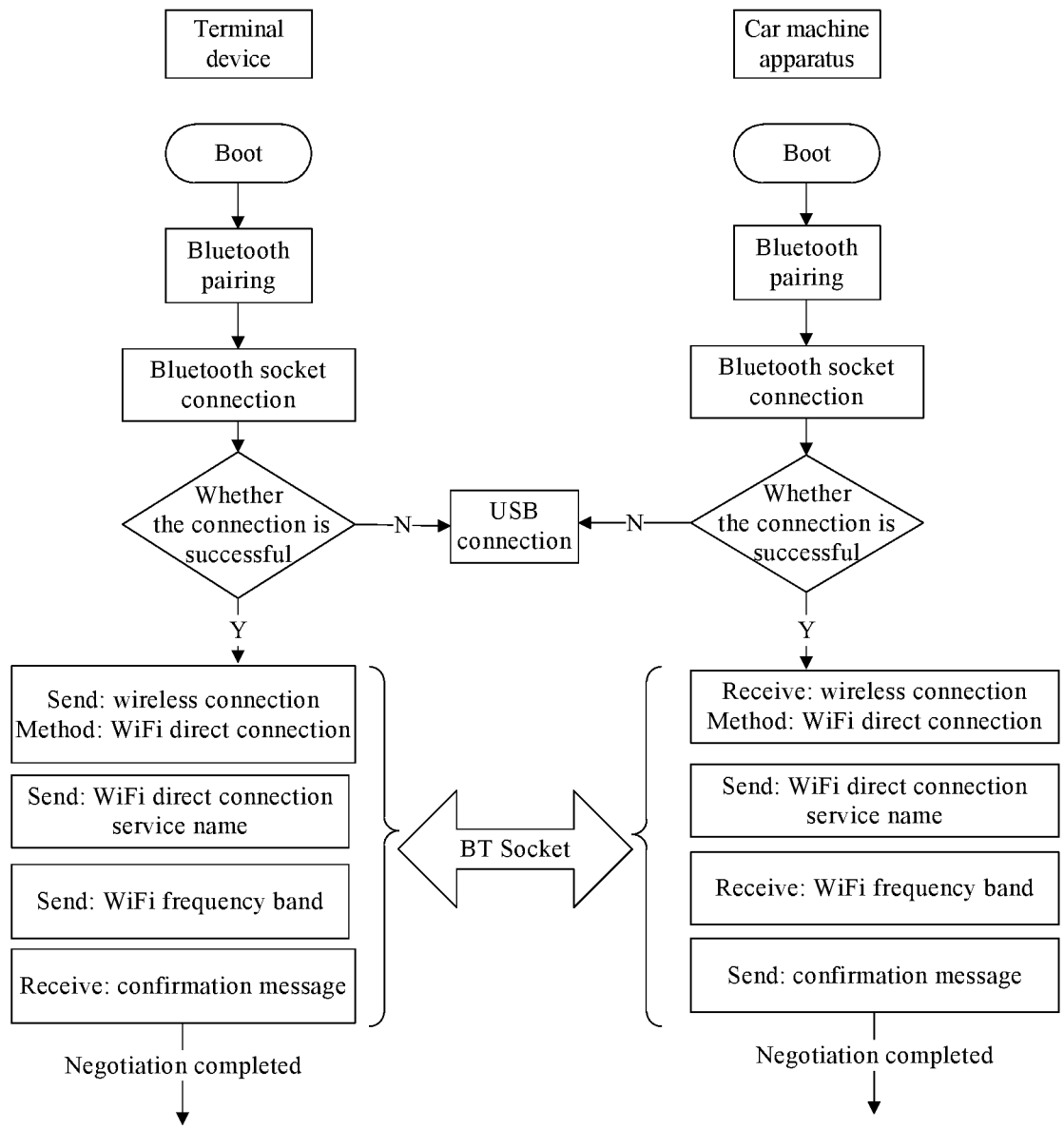
FIG. 5 is a flow schematic diagram of a parameter information negotiation and determination provided by the second embodiment of the present disclosure.

Exemplarily, the following is an exemplary description of an overall process of automatically negotiating between a terminal device and a car machine apparatus in order to determine parameter information required to establish a WiFi direct connection, before a WiFi direct connection establishment, with reference to FIG. 5: when the terminal and the car machine apparatus are started, the terminal device and the car machine apparatus automatically perform a Bluetooth pairing connection and a Bluetooth communication connection (such as the Bluetooth Socket connection shown in FIG. 5), performs a Bluetooth communication (such as BT Socket shown in FIG. 5) through the Bluetooth communication connection, and negotiates the parameter information required to establish the WiFi direct connection between the terminal device and the car machine apparatus after the Bluetooth communication connection is successful. For example, as shown in FIG. 5, the car machine apparatus sends the parameter information such as a wireless connection manner is the WiFi direct connection, a WiFi direct connection service name, a WiFi direct connection frequency band and so forth. The terminal device receives and confirms these parameters, then sends a confirmation message to the terminal device, and the terminal device receives the confirmation message and completes the negotiation of the parameter information required to establish the WiFi direct connection. In addition, according to a preset rule, if the Bluetooth communication connection fails to be established, a connection between the terminal device and the car machine apparatus can also be realized through any method in the prior art such as a USB connection.

Figure 6:
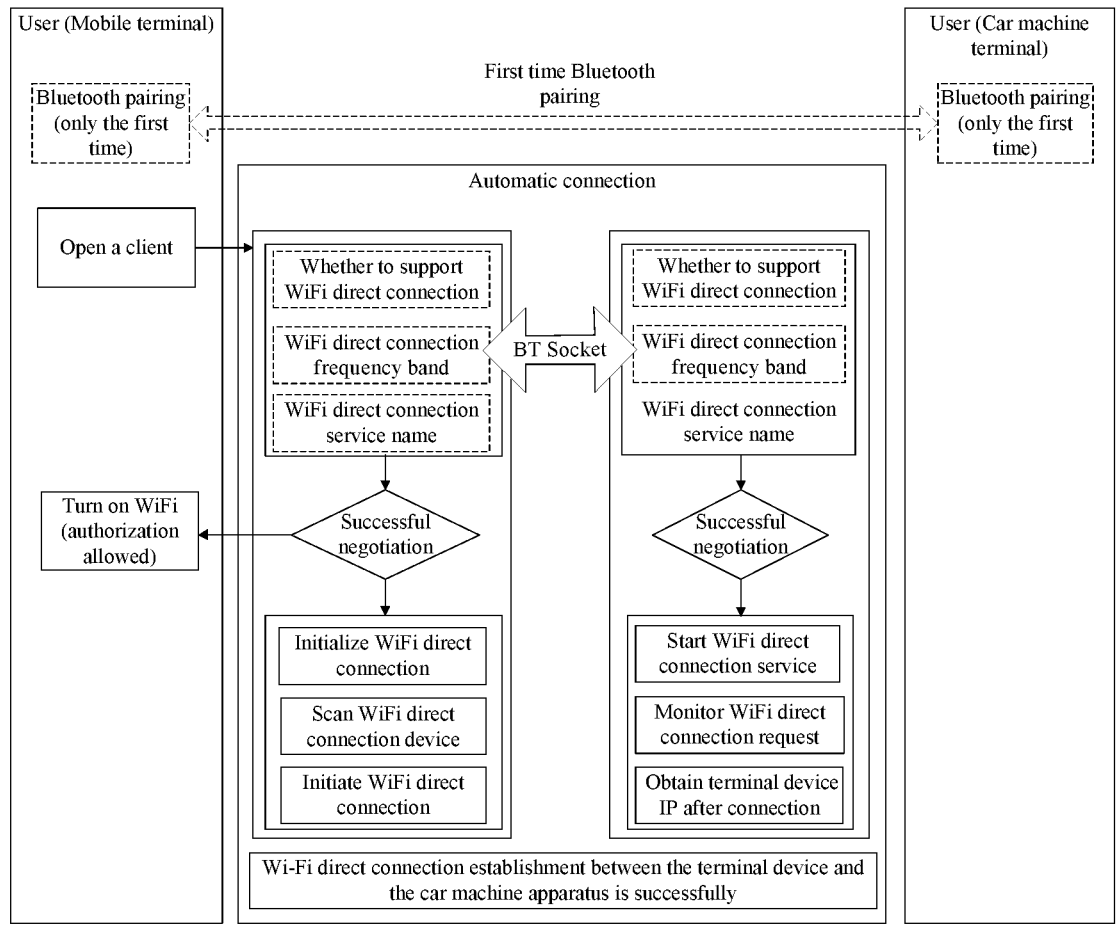
FIG. 6 is an overall flow schematic diagram of a wireless connection establishment provided by the second embodiment of the present disclosure.

Exemplarily, the following is an exemplary description of an overall process of automatically establishing a WiFi direct connection between a terminal device and a car machine apparatus with reference to FIG. 6: in a first Bluetooth pairing, a user manually performs the Bluetooth pairing between the terminal device used and the car machine apparatus of a vehicle, and the terminal device and the car machine apparatus will automatically perform the Bluetooth pairing to establish a Bluetooth pairing connection after subsequent terminal devices entering a communication range of the car machine apparatus. Then the car machine apparatus can automatically obtain a Bluetooth communication address of the terminal device, and establish the Bluetooth communication connection with the terminal device. Through the Bluetooth communication connection, the terminal device negotiates with the car machine apparatus to confirm the parameter information required to establish the WiFi direct connection. After the parameter information is negotiated successfully, the terminal device and the car machine apparatus initialize a WiFi module respectively. The terminal device scans a WiFi direct connection device according to the parameter information, and sends a WiFi direct connection request to the car machine apparatus; the car machine apparatus monitors the WiFi direct connection request; the terminal device establishes the WiFi direct connection with the car machine apparatus, and then the car machine apparatus can obtain the communication address (such as an IP address, etc.) of the terminal device, the terminal device and the car machine apparatus are successfully connected. In actual use, the user opens a client application which has established the direct WiFi connected with a car machine terminal on mobile terminals; the car machine terminal would open a corresponding application when it is starting, and the car machine terminal can pull up corresponding applications automatically or in response to an operation of the user after the WiFi direct connection is successful. In addition, it is necessary to authorize a client to open and use WiFi permissions on the mobile terminal, which are some conventional settings and will not be repeated herein.

After the WiFi direct connection between the terminal device and the car machine apparatus is established, a data communication method between the terminal device and the car machine apparatus performed through the WiFi direct connection is similar to the data communication method through the USB connection, which can support operations of the terminal device such as lock screen, background screenshots and so forth, the terminal device supports a mobile network and a WiFi connection. After a WiFi direct connection client on the terminal device is opened, the WiFi direct connection between the terminal device and the car machine apparatus can be automatically established, and the user can use the terminal device normally, including the operations such as screen lock, background screenshots, audio/video display and so forth, which will not cause any impact on the use of terminal device.

In addition, older car machines cannot connect to the Internet, and the terminal device cannot use the mobile network after the terminal device establishing a WiFi hotspot connection with the vehicle. In this embodiment, the terminal device is selected to establish the direct WiFi connection with the car machine, the mobile terminal can still use the mobile network after the WiFi direct connection is established.

The embodiment of the present disclosure allows for when the Bluetooth pairing connection is monitored by the car machine apparatus, if it is determined that the current WiFi direct connection is not the first WiFi direct connection according to the historical WiFi direct connection data, the terminal device that has established the WiFi direct connection last time is preferentially taken as the terminal device to establish the WiFi direct connection this time; if it is determined that the current WiFi direct connection is the first WiFi direct connection, a device that has established the Bluetooth pairing connection currently will be taken as the terminal device, and the terminal device to be connected can be automatically selected without manually selecting the terminal device by the user; then, the car machine apparatus obtains the Bluetooth communication address of the terminal device, and sends the Bluetooth communication connection request to the terminal device; the terminal device accepts the request, the terminal device and the car machine apparatus automatically establish the Bluetooth communication connection, and negotiate the parameter information required to establish the WiFi direct connection through the Bluetooth communication connection; further, the terminal device searches for a candidate WiFi device that allows a WiFi direct connection establishment according to a WiFi direct connection service name in the parameter information; determines the car machine apparatus in the candidate WiFi device according to the WiFi device identifier of the car machine apparatus in the parameter information; sends the WiFi direct connection request to the car machine apparatus; the car machine apparatus accepts the request and establishes the WiFi direct connection with the terminal device without manually selecting the car machine apparatus to be connected by the user, an automatic establishment of the WiFi direct connection between the car machine apparatus and the terminal device is realized, user operations are reduced, and would not affect other functions such as driving the vehicle or using the terminal device by the user.

Figure 7:
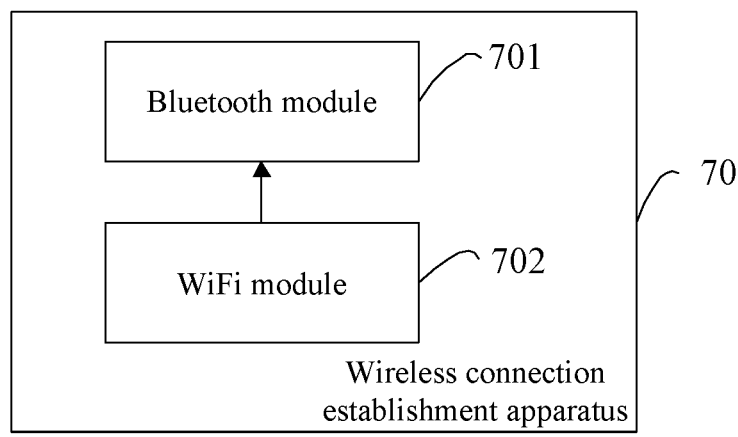
FIG. 7 is a schematic diagram of a wireless connection establishment apparatus provided by a third embodiment of the present disclosure.

FIG. 7 is a schematic diagram of a wireless connection establishment apparatus provided by a third embodiment of the present disclosure. The wireless connection establishment apparatus provided in an embodiment of the present disclosure may execute a processing flow provided by a method embodiment for establishing a wireless connection. As shown in FIG. 7, the wireless connection establishment apparatus 70 includes a Bluetooth module 701 and a WiFi module 702.

Specifically, the Bluetooth module 701 is configured to establish a Bluetooth communication connection with a terminal device to be connected.

The Bluetooth module 701 is further configured to provide parameter information required to establish a WiFi direct connection to the terminal device through the Bluetooth communication connection.

The WiFi module 702 is configured to establish the WiFi direct connection with the terminal device in response to a WiFi direct connection request sent by a terminal device based on the parameter information.

The apparatus provided in the embodiment of the present disclosure may be specifically used to execute the method flow executed by the car machine apparatus in the above-mentioned first embodiment, and specific functions will be not repeated herein.

The embodiment of the present disclosure allows for before establishing the WiFi direct connection between the car machine apparatus and the terminal device, the Bluetooth communication connection between the two is established firstly, the car machine apparatus provides the parameter information required to establish the WiFi direct connection with the car machine apparatus to the terminal device through the Bluetooth communication connection, then the terminal device can automatically send the WiFi direct connection request to the car machine apparatus based on the parameter information, and the car machine apparatus device establishes the WiFi direct connection with the terminal device in response to the WiFi direct connection request initiated by the terminal device without a manual search as well as a selection and confirmation of the WiFi device to be connected by the user, an automatic establishment of the WiFi direct connection between the car machine apparatus and the terminal device is realized, user operations are reduced, and would not affect other functions such as driving the vehicle or using the terminal device by the user.

On the basis of the foregoing third embodiment, in a fourth embodiment of the present disclosure, the Bluetooth module is further configured to:

obtain a Bluetooth communication address of the terminal device that has established a Bluetooth pairing connection when the Bluetooth pairing connection is monitored; send a Bluetooth communication connection request to the terminal device according to the Bluetooth communication address of the terminal device, to establish the Bluetooth communication connection with the terminal device.

In an optional implementation, the Bluetooth module is further configured to:

when the Bluetooth pairing connection is monitored, in a case that it is determined that a current WiFi direct connection is not the first WiFi direct connection based on historical WiFi direct connection data, take the terminal device that has established the WiFi direct connection last time as the terminal device that established the WiFi direct connection this time; in a case that the terminal device has not established the WiFi direct connection with the car machine apparatus, obtain the Bluetooth communication address of the terminal device after waiting for the Bluetooth pairing connection has been established between the terminal device and the car machine apparatus.

In an optional implementation, the Bluetooth module is further configured to:

when the Bluetooth pairing connection is monitored, in a case that it is determined that the current WiFi direct connection is the first WiFi direct connection based on the historical WiFi direct connection data, take the device that has been established the Bluetooth pairing connection currently as the terminal device, and obtain the Bluetooth communication address of the terminal device.

In an optional implementation, the Bluetooth module is further configured to:

send prompt information after sending the Bluetooth communication connection request to the terminal device according to the Bluetooth communication address of the terminal device, where the prompt information is used to prompt the user to open a client for establishing the WiFi direct connection on the terminal device.

In an optional implementation, the Bluetooth module is further configured to:

perform data communication with the terminal device to negotiate and determine the parameter information required to establish the WiFi direct connection with the terminal device through Bluetooth communication connection.

In an optional implementation, the parameter information required for the WiFi direct connection at least includes a WiFi direct connection service name and a WiFi device identifier of the car machine apparatus.

The apparatus provided in the embodiment of the present disclosure may be specifically used to execute the method flow executed by the car machine apparatus in the foregoing second embodiment, and the specific functions will not be repeated herein.

The embodiment of the present disclosure allows for when the Bluetooth pairing connection is monitored by the car machine apparatus, if it is determined that the current WiFi direct connection is not the first WiFi direct connection according to the historical WiFi direct connection data, the terminal device that has established the WiFi direct connection last time is preferentially taken as the terminal device to establish the WiFi direct connection this time; if it is determined that the current WiFi direct connection is the first WiFi direct connection, a device that has established the Bluetooth pairing connection currently will be taken as the terminal device, and the terminal device to be connected can be automatically selected without manually selecting the terminal device by the user; then, the car machine apparatus obtains the Bluetooth communication address of the terminal device, and sends the Bluetooth communication connection request to the terminal device; the terminal device accepts the request, the terminal device and the car machine apparatus automatically establish the Bluetooth communication connection, and negotiate the parameter information required to establish the WiFi direct connection through the Bluetooth communication connection; further, the terminal device searches for the candidate WiFi device that allows a WiFi direct connection establishment according to a WiFi direct connection service name in the parameter information; determines the car machine apparatus in the candidate WiFi device according to the WiFi device identifier of the car machine apparatus in the parameter information; sends the WiFi direct connection request to the car machine apparatus; the car machine apparatus accepts the request and establishes the WiFi direct connection with the terminal device without manually selecting the car machine apparatus to be connected by the user, an automatic establishment of the WiFi direct connection between the car machine apparatus and the terminal device is realized, user operations are reduced, and would not affect other functions such as driving the vehicle or using the terminal device by the user.

Figure 8:
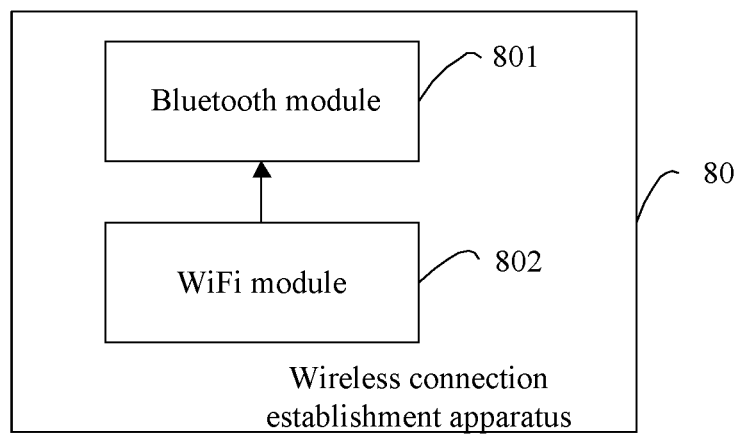
FIG. 8 is a schematic diagram of a wireless connection establishment apparatus provided by a fifth embodiment of the present disclosure.

FIG. 8 is a schematic diagram of a wireless connection establishment apparatus provided by a fifth embodiment of the present disclosure. The wireless connection establishment apparatus provided in the embodiment of the present disclosure may execute a processing flow provided in a method embodiment for establishing a wireless connection. As shown in FIG. 8, the wireless connection establishment apparatus 80 includes: a Bluetooth module 801 and a WiFi module 802.

Specifically, the Bluetooth module 801 is configured to establish a Bluetooth communication connection with a car machine of a vehicle.

The Bluetooth module 801 is further configured to obtain parameter information required to establish a WiFi direct connection through the Bluetooth communication connection.

The WiFi module 802 is configured to send a WiFi direct connection request to the car machine apparatus according to the parameter information required to establish the WiFi direct connection, so as to establish the WiFi direct connection with the car machine apparatus.

The apparatus provided in the embodiment of the present disclosure may be specifically used to execute the method flow executed by the terminal device in the foregoing first embodiment, and the specific functions will not be repeated herein.

The embodiment of the present disclosure allows for before establishing the WiFi direct connection between the car machine apparatus and the terminal device, the Bluetooth communication connection between the two is established firstly, the car machine apparatus provides the parameter information required to establish the WiFi direct connection with the car machine apparatus to the terminal device through the Bluetooth communication connection, then the terminal device can automatically send the WiFi direct connection request to the car machine apparatus based on the parameter information, and the car machine apparatus device establishes the WiFi direct connection with the terminal device in response to the WiFi direct connection request initiated by the terminal device without a manual search as well as a selection and confirmation of the WiFi device to be connected by the user, an automatic establishment of the WiFi direct connection between the car machine apparatus and the terminal device is realized, user operations are reduced, and would not affect other functions such as driving the vehicle or using the terminal device by the user.

On the basis of the foregoing fifth embodiment, in a sixth embodiment of the present disclosure, the Bluetooth module is further configured to:
  establish a Bluetooth communication connection with the car machine apparatus in response to a Bluetooth communication connection request sent by the car machine apparatus.

In an optional implementation, the Bluetooth module is further configured to:
  establish a Bluetooth pairing connection with the car machine apparatus before establishing the Bluetooth communication connection with the car machine apparatus.

In an optional implementation, the Bluetooth module is further configured to:
  perform data communication with the car machine apparatus to negotiate and determine parameter information required to establish the WiFi direct connection with the car machine apparatus through the Bluetooth communication connection.

In an optional implementation, the WiFi module is further configured to:
  search for a candidate WiFi device that allows a WiFi direct connection establishment according to a WiFi direct connection service name in the parameter information; determine the car machine apparatus in the candidate WiFi device according to a WiFi device identifier of the car machine apparatus in the parameter information, and send the WiFi direct connection request to the car machine apparatus.

In an optional implementation, the WiFi module is further configured to:
  after searching for the candidate WiFi device that allows the WiFi direct connection establishment according to the WiFi direct connection service name in the parameter information, it is determined that the car machine apparatus is not included in the candidate WiFi device according to the WiFi device identifier of the car machine apparatus in the parameter information, search for the candidate WiFi device that allows the WiFi direct connection establishment again, until the searched candidate WiFi device includes the car machine apparatus.

The apparatus provided in the embodiment of the present disclosure may be specifically used to execute the method flow executed by the terminal device in the foregoing second embodiment, and the specific functions will not be repeated herein.

The embodiment of the present disclosure allows for when the Bluetooth pairing connection is monitored by the car machine apparatus, if it is determined that the current WiFi direct connection is not the first WiFi direct connection according to the historical WiFi direct connection data, the terminal device that has established the WiFi direct connection last time is preferentially taken as the terminal device to establish the WiFi direct connection this time; if it is determined that the current WiFi direct connection is the first WiFi direct connection, a device that has established the Bluetooth pairing connection currently will be taken as the terminal device, and the terminal device to be connected can be automatically selected without manually selecting the terminal device by the user; then, the car machine apparatus obtains the Bluetooth communication address of the terminal device, and sends the Bluetooth communication connection request to the terminal device; the terminal device accepts the request, the terminal device and the car machine apparatus automatically establish the Bluetooth communication connection, and negotiate the parameter information required to establish the WiFi direct connection through the Bluetooth communication connection; further, the terminal device searches for a candidate WiFi device that allows a WiFi direct connection establishment according to a WiFi direct connection service name in the parameter information; determines the car machine apparatus in the candidate WiFi device according to the WiFi device identifier of the car machine apparatus in the parameter information; sends the WiFi direct connection request to the car machine apparatus; the car machine apparatus accepts the request and establishes the WiFi direct connection with the terminal device without manually selecting the car machine apparatus to be connected by the user, an automatic establishment of the WiFi direct connection between the car machine apparatus and the terminal device is realized, user operations are reduced, and would not affect other functions such as driving the vehicle or using the terminal device by the user.

According to embodiments of the present disclosure, the present disclosure also provides an electronic device and a readable storage medium.

Figure 9:
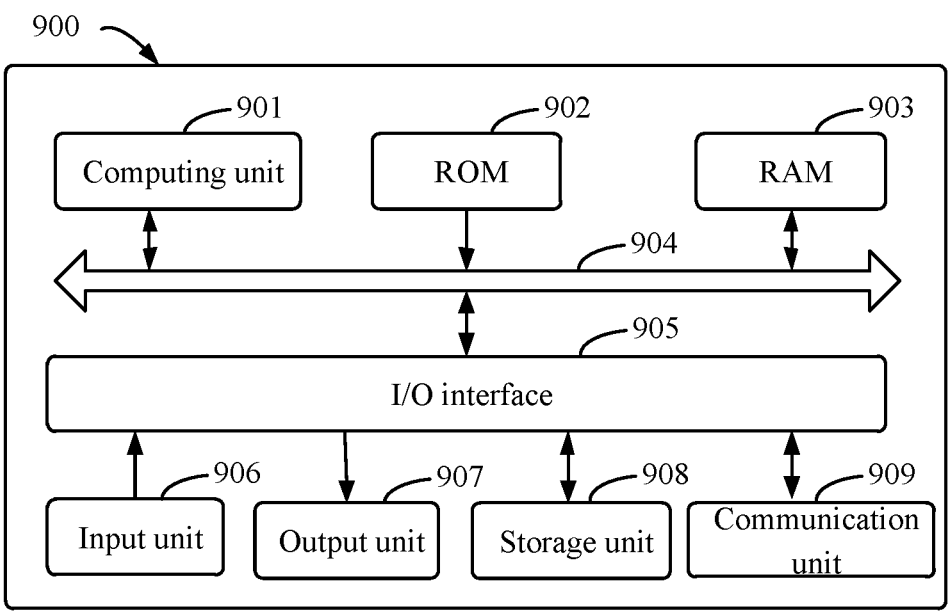
FIG. 9 is a block diagram of an electronic device used to implement a wireless connection establishment method in an embodiment of the present disclosure.

FIG. 9 shows a schematic block diagram of an example electronic device 900 that can be used to implement embodiments of the present disclosure. Electronic devices are intended to represent various forms of digital computers, such as laptop computers, desktop computers, workstations, personal digital assistants, servers, blade servers, mainframe computers and other suitable computers. The electronic devices can also represent various forms of mobile devices, such as personal digital assistants, cellular phones, smart phones, wearable devices and other similar computing devices. Components shown herein, their connections and relationships and their functions are merely examples, and are not intended to limit the implementation of the present disclosure described and/or required herein.

As shown in FIG. 9, the electronic device 900 includes a computing unit 901, which can execute various appropriate actions and processing based on a computer program stored in a read only memory (ROM) 902 or the computer program loaded from a storage unit 908 to a random access memory (RAM) 903. In the RAM 903, various programs and data required for an execution of the electronic device 900 can also be stored. The calculation unit 901, the ROM 902 and the RAM 903 are connected to each other through a bus 904. An input/output (I/O) interface 905 is also connected to the bus 904.

Multiple components in the electronic device 900 are connected to the I/O interface 905, including: an input unit 906, such as a keyboard, a mouse and so forth; an output unit 907, such as various types of displays, speakers and so forth; a storage unit 908, such as disks, Optical discs and so forth; and a communication unit 909, such as network cards, modems, wireless communication transceivers and so forth. The communication unit 909 allows the electronic device 900 to exchange information/data with other devices through a computer network such as the Internet and/or various telecommunication networks.

The computing unit 901 may be various general-purpose and/or special-purpose processing components with processing and computing capabilities. Some examples of the computing unit 901 include, but are not limited to, central processing unit (CPU), graphics processing unit (GPU), various dedicated artificial intelligence (AI) computing chips, various computing units that run machine learning model algorithms and digital signal processors (DSP), as well as any appropriate processor, controller, microcontroller and so forth. The calculation unit 901 executes the various methods and processes described above, such as the data acquisition method. For example, in some embodiments, the data acquisition method can be implemented as a computer software program, which is tangibly contained in a machine-readable medium, such as the storage unit 908. In some embodiments, part or all of the computer program may be loaded and/or installed on the device 1100 via the ROM 902 and/or the communication unit 909. The computer program can execute one or more steps of the data acquisition method described above when loaded into the RAM 903 and executed by the computing unit 901. Alternatively, in other embodiments, the computing unit 901 may be configured to perform the data acquisition method in any other suitable manner (for example, by means of firmware).

Various implementations of the systems and technologies described above herein can be implemented in digital electronic circuit systems, integrated circuit systems, field programmable gate arrays (FPGA), application-specific integrated circuits (ASIC), application-specific standard products (ASSP), system on chip system (SOC), load programmable logic device (CPLD), computer hardware, firmware, software, and/or a combination thereof. The various implementations may include: being implemented in one or more computer programs, where the one or more computer programs may be executed and/or interpreted on a programmable system including at least one programmable processor, the programmable processor can be a dedicated or general-purpose programmable processor that can receive data and instructions from a storage system, at least one input apparatus and at least one output apparatus, and transmit the data and instructions to the storage system, the at least one input apparatus and the at least one output apparatus.

Program codes used to implement the method of the present disclosure can be written in any combination of one or more programming languages. These program codes can be provided to the processors or controllers of the general-purpose computers, special-purpose computers or other programmable data processing apparatus, so that functions/operations specified in the flowcharts and/or block diagrams can be implemented when the program codes are executed by the processors or controllers. The program code can be entirely executed on a machine, partly executed on the machine, partly executed on the machine and partly executed on a remote machine as an independent software package, or entirely executed on the remote machine or a server.

In the context of the present disclosure, the machine-readable medium may be a tangible medium, which may contain or store a program for use by an instruction execution system, apparatus, or device or in combination with the instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus or devices, or any suitable combination of the foregoing. More specific examples of the machine-readable storage media would include electrical connections based on one or more wires, portable computer disks, hard disks, random access memories (RAM), read-only memories (ROM), erasable programmable read-only memories (EPROM or flash memory), optical fibers, portable compact disk read-only memories (CD-ROM), optical storage devices, magnetic storage devices, or any suitable combination of the foregoing.

In order to provide an interaction with the user, the system and technologies described herein can be implemented on a computer, and the computer includes: a display apparatus for displaying information to the user (for example, CRT (cathode ray tube) or LCD (liquid crystal display) monitor); and a keyboard and pointing apparatus (for example, a mouse or a trackball) through which the user can provide input to the computer. Other types of apparatuses can also be used to provide the interaction with the user; for example, feedback provided to the user can be any form of sensory feedback (for example, visual feedback, auditory feedback, or tactile feedback); and the input from the user can be received in any form (including acoustic input, voice input, or tactile input).

The systems and technologies described herein can be implemented in a computing system that includes back-end components (for example, a data server), or a computing system that includes middleware components (for example, an application server), or the computing system that includes front-end components (for example, a user computer with a graphical user interface or a web browser, through which the user can interact with the implementation of the system and technology described herein), or the computing system that includes any combination of such back-end components, middleware components, or front-end components. The components of the system can be connected to each other through digital data communication (for example, a communication network) in any form or medium. Examples of the communication networks include: local area network (LAN), wide area network (WAN), and the Internet.

The computer system may include a client and a server. The client and the server are generally far away from each other and usually interact through a communication network. A relationship between the client and the server is generated by running the computer programs have a client-server relationship with each other on the corresponding computers. The server can be a cloud server, also known as a cloud computing server or a cloud host, which is a host product in the cloud computing service system to solve a shortcomings of difficult management and weak business scalability among a traditional physical host and a VPS service ("Virtual Private Server", or "VPS" for short). The server can also be a server of a distributed system, or a server combined with a blockchain.

It should be understood that the various forms of processes shown above can be used to reorder, add or delete steps. For example, the steps described in the present disclosure can be executed in parallel, sequentially, or in a different order, as long as a desired result of the technical solution disclosed in the present disclosure can be achieved, which is not limited herein.

The above specific implementations do not constitute a limitation on a protection scope of the present disclosure. Those skilled in the art should understand that various modifications, combinations, sub-combinations and substitutions can be made according to design requirements and other factors. Any modification, equivalent replacement and improvement made within a spirit and principle of the present disclosure shall be included in the protection scope of the present disclosure.

What is claimed is:

1. A wireless connection establishment method, applied to a car machine apparatus, comprising:
    establishing a Bluetooth communication connection with a terminal device to be WiFi direct connected;
    providing parameter information required to establish a WiFi direct connection to the terminal device to be WiFi direct connected through the Bluetooth communication connection; and
    establishing the WiFi direct connection with the terminal device to be WiFi direct connected in response to a WiFi direct connection request sent by the terminal device to be WiFi direct connected based on the parameter information;
    wherein the establishing the Bluetooth communication connection with the terminal device to be WiFi direct connected comprises:
    obtaining a Bluetooth communication address of the terminal device to be WiFi direct connected after a Bluetooth pairing connection has been established between the car machine apparatus and a first terminal device; and
    sending a Bluetooth communication connection request to the terminal device to be WiFi direct connected according to the Bluetooth communication address of the terminal device to be WiFi direct connected, to establish the Bluetooth communication connection with the terminal device to be WiFi direct connected;
    wherein the obtaining the Bluetooth communication address of the terminal device to be WiFi direct connected comprises:
    in a case that it is determined that a WiFi direct connection to be established is not a first WiFi direct connection according to historical WiFi direct connection data after the Bluetooth pairing connection has been established between the car machine apparatus and the first terminal device, taking a second terminal device that had established the WiFi direct connection last time as the terminal device to be WiFi direct connected; and in a case that the second terminal device has not established a Bluetooth pairing connection with the car machine apparatus, obtaining the Bluetooth communication address of the second terminal device after waiting for the Bluetooth pairing connection has been established with the second terminal device; and
    in a case that it is determined that the WiFi direct connection to be established is the first WiFi direct connection according to the historical WiFi direct connection data, taking the first terminal device that has established the Bluetooth pairing connection with the car machine apparatus as the terminal device to be WiFi direct connected, and obtaining the Bluetooth communication address of the first terminal device.

2. The method according to claim 1, wherein after the sending the Bluetooth communication connection request to the terminal device to be WiFi direct connected according to the Bluetooth communication address of the terminal device to be WiFi direct connected, the method further comprises:
    sending prompt information, wherein the prompt information is used to prompt a user to open a client for establishing the WiFi direct connection on the terminal device to be WiFi direct connected.

3. The method according to claim 1, wherein the providing the parameter information required to establish the WiFi direct connection to the terminal device to be WiFi direct connected through the Bluetooth communication connection comprises:
    performing data communication with the terminal device to be WiFi direct connected to negotiate and determine the parameter information required to establish the WiFi direct connection with the terminal device to be WiFi direct connected through the Bluetooth communication connection.

4. The method according to claim 1, wherein the parameter information required for the WiFi direct connection at least comprises a WiFi direct connection service name and a WiFi device identifier of the car machine apparatus.

5. A non-transitory computer-readable storage medium storing computer instructions, the computer instructions are used to enable a computer to execute the method according to claim 1.

6. A wireless connection establishment apparatus, applied to a car machine apparatus, comprising:
at least one processor;
a communication interface connected with the at least one processor; and
a memory connected with the at least one processor; wherein,
the memory stores instructions executable by the at least one processor, and the instructions are executed by the at least one processor to enable the at least one processor to:
establish a Bluetooth communication connection with a terminal device to be WiFi direct connected;
provide parameter information required to establish a WiFi direct connection to the terminal device to be WiFi direct connected through the Bluetooth communication connection; and
establish the WiFi direct connection with the terminal device to be WiFi direct connected in response to a WiFi direct connection request sent by the terminal device to be WiFi direct connected based on the parameter information;
obtain a Bluetooth communication address of the terminal device to be WiFi direct connected after a Bluetooth pairing connection has been established between the car machine apparatus and a first terminal device; and
send a Bluetooth communication connection request to the terminal device to be WiFi direct connected according to the Bluetooth communication address of the terminal device to be WiFi direct connected, to establish the Bluetooth communication connection with the terminal device to be WiFi direct connected;
wherein the at least one processor is further enabled to:
in a case that it is determined that a WiFi direct connection to be established is not a first WiFi direct connection according to historical WiFi direct connection data after the Bluetooth pairing connection has been established between the car machine apparatus and the first terminal device, take a second terminal device that had established the WiFi direct connection last time as the terminal device to be WiFi direct connected; and in a case that the second terminal device has not established a Bluetooth pairing connection with the car machine apparatus, obtain the Bluetooth communication address of the second terminal device after waiting for the Bluetooth pairing connection has been established with the second terminal device;
in a case that it is determined that the WiFi direct connection to be established is the first WiFi direct connection according to the historical WiFi direct connection data, take the first terminal device that has established the Bluetooth pairing connection with the car machine apparatus as the terminal device to be WiFi direct connected, and obtain the Bluetooth communication address of the first terminal device to be WiFi direct connected.

7. The apparatus according to claim 6, wherein the at least one processor is further enabled to:
send, through the communication interface, prompt information after the sending the Bluetooth communication connection request to the terminal device to be WiFi direct connected according to the Bluetooth communication address of the terminal device to be WiFi direct connected, wherein the prompt information is used to prompt a user to open a client for establishing the WiFi direct connection on the terminal device to be WiFi direct connected.

8. The apparatus according to claim 6, wherein the at least one processor is further enabled to:
perform data communication with the terminal device to be WiFi direct connected to negotiate and determine the parameter information required to establish the WiFi direct connection with the terminal device to be WiFi direct connected through the Bluetooth communication connection.

* * * * *